UNITED STATES PATENT OFFICE.

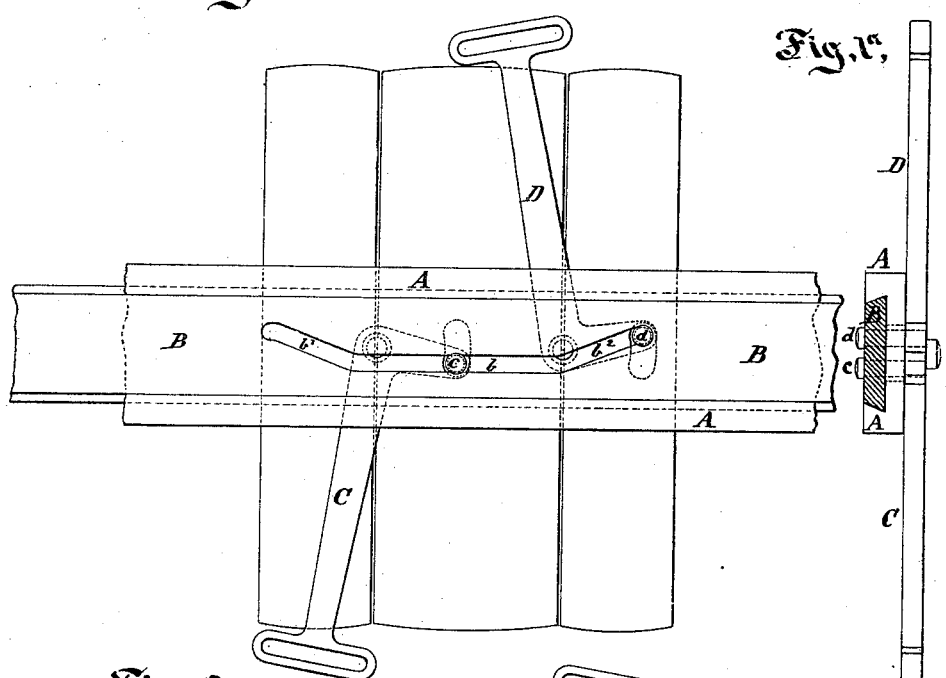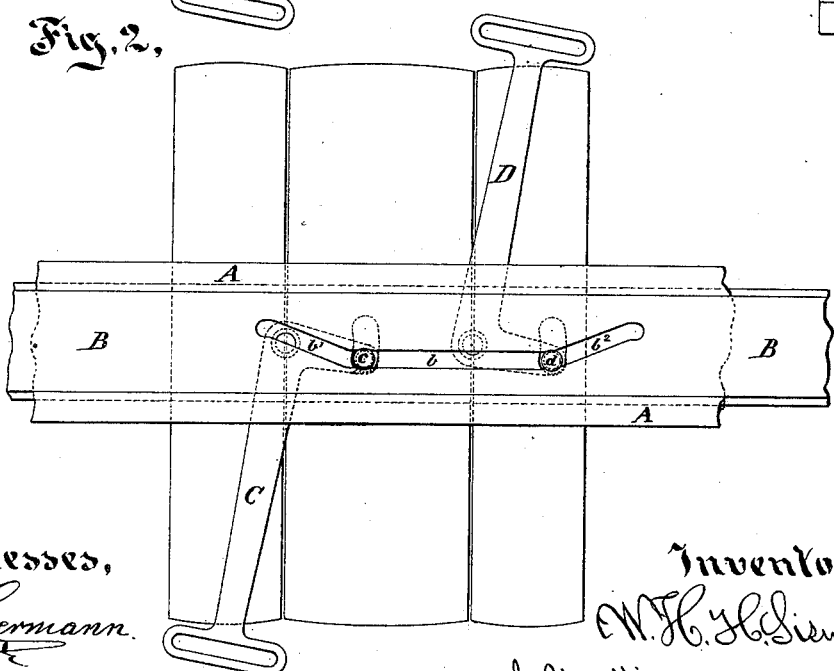

WILLIAM H. H. SISUM, OF NEWARK, NEW JERSEY.

Letters Patent No. 113,939, dated April 18, 1871.

IMPROVEMENT IN BELT-SHIFTERS.

The Schedule referred to in these Letters Patent and making part of the same.

*To all whom it may concern:*

Be it known that I, WILLIAM H. H. SISUM, of Newark, in the county of Essex and State of New Jersey, have invented certain new and useful Improvements in Belt-Shifters.

My invention is intended more particularly for planing-machines carrying heavy masses of machinery or other castings to be planed, but may be used with advantage in any situation where two belts running in opposite directions are to be alternately shifted from fast to loose pulleys so as to revolve a shaft in opposite directions alternately from continuously-running belts.

I effect the shifting by moving a bar longitudinally, and transmit the motion therefrom to the belts through the medium of pins received in a slot in the bar, which is oblique at some points and straight or directly longitudinal at others. It acts with the effect of a wedge in shifting the belt. The proportions may be varied within wide limits.

The following is a description of what I consider the best means of carrying out the invention:

The accompanying drawing forms a part of this specification.

Figure 1 is a plan view with the levers in position for receiving motion in one direction, and Figure 2 is a plan view showing the levers in the intermediate position which they hold after the bar has commenced to move and has thrown that belt out of action which was before in action and has not yet thrown the other into action.

Figure 1$^a$ is an elevation showing a cross-section of the shifter-bar and a small portion of one of the pulleys.

Similar letters of reference indicate like parts in both the figures.

A is a portion of the fixed frame-work of the machine, with guides fixed thereon which afford lateral support to the broad slide-bar B carrying the slots $b\ b^1\ b^2$.

The bar B may extend along the machine for any distance, and may be provided with one or more handles by which it may be conveniently seized to be shifted forward and backward by the workmen, or it may be connected to any ordinary or suitable mechanism to change its position.

C and D are bell-crank levers. The long arm of each carries a loop through which passes a belt not represented.

The short arm of each carries a pin—the pin $c$ on the lever C, and the pin $d$ on the lever D. Both the pin $c$ and $d$ stand in the slot in the slide-bar B.

The arrangement of the pulleys of the drum for driving the belts is too familiar to require minute description.

The belt which runs through the lever C is a direct or open belt; the belt which runs through the lever D is a crossed belt; and, both running on the same drum above, the pulleys on which they run below necessarily revolve in directions opposite to each other.

There are one or two fast pulleys which receive the belts alternately, and consequently impart the motion to its shaft alternately in opposite directions.

There are, each side of the fast pulleys, one or more loose pulleys.

I prefer this arrangement for various reasons, one of which is the facility which it affords for arresting the loose pulleys at any time, by the hand, to oil them.

The function of the belt-shifter is to shift each belt alternately from the loose pulley on to a fast pulley, and back again.

In the position shown in fig. 1 the open belt which runs through the lever C is running on a loose pulley, and the crossed belt, which it will be understood runs through the lever D, is running on the fast pulley. The crossed belt is, therefore, efficient in imparting its motion to the shaft.

Now, when the bar B is moved longitudinally the pin $d$, which is fixed in the lever D, is traversed in the oblique portion $b^1$ of the slot, while the pin $c$, which is fixed in the other lever C, is traversed in the straight portion $b$ of the slot; consequently, the first effect of the motion is to shift the lever D and carry its belt upon its loose pulley, thus leaving both belts running for a little time on their respective loose pulleys.

For a very brief period both pins $c$ and $d$ are in the straight portion $b$ of the slot, but the continued movement of the slide-bar B receives the pin $c$ in the oblique part $b^1$ of the slot and moves the lever C.

This movement shifts the open belt carried by C upon the fast pulley, and commences to revolve the shaft in the direction opposite to that in which it was revolved before.

The reverse of these movements at the proper period shifts the belts back again.

By reference to the figures it will be observed that beyond the termination of the oblique part of each slot the slot is extended a very little ways directly longitudinal of the bar B. This allows the bar B to come to rest gradually, without moving the belts, after both are rapidly and fully shifted to their proper positions.

The slots in which the pins $c\ d$ traverse in the fixed portion of the work under or behind the bar B are indicated in dotted lines.

In case the arrangement of the fast and loose pulleys is reversed, so that two fast pulleys are employed outside of one or more loose pulleys, the arrangement of the inclined portions $b^1$ $b^2$ of the slot must be correspondingly changed, as will be readily understood by any good mechanic. In such case the inclined portions will be close together, like the sides of a V, and a straight portion of the slot will be outside thereof on each side.

I claim as my invention—

The bar B, endwise mounted, so as to be moved at will, with its longitudinal and oblique slots $b$ $b^1$ $b^2$ arranged to operate on the two belt-shifting levers C D, through the medium of the pins $c$ $d$, or their equivalents, as and for the purposes herein specified.

In testimony whereof I have hereunto set my name in presence of two subscribing witnesses.

WM. H. H. SISUM.

Witnesses:
 JOHN G. CRAMFORD,
 THOMAS GORDON.